United States Patent
Makita et al.

[11] Patent Number: 5,496,621
[45] Date of Patent: * Mar. 5, 1996

[54] GLASS PANE WITH REFLECTANCE REDUCING COATING AND COMBINER OF HEAD-UP DISPLAY SYSTEM

[75] Inventors: Kensuke Makita, Ichishi; Atsushi Takamatsu; Katsuto Tanaka, both of Matsusaka, all of Japan

[73] Assignee: Central Glass Company, Limited, Yamauchi, Japan

[*] Notice: The portion of the term of this patent subsequent to Apr. 23, 2012, has been disclaimed.

[21] Appl. No.: 228,522

[22] Filed: Apr. 15, 1994

[30] Foreign Application Priority Data

Apr. 16, 1993 [JP] Japan .................................. 5-89636
May 31, 1993 [JP] Japan .................................. 5-129284

[51] Int. Cl.$^6$ .................................................. G02B 1/100
[52] U.S. Cl. .......................... 428/216; 428/212; 428/336; 428/426; 428/432; 428/437; 428/697; 428/701; 428/702; 428/913; 359/359; 359/586; 359/589
[58] Field of Search ................................. 428/600, 195, 428/212, 210, 688, 216, 336, 436, 679, 701, 702, 439, 432, 437, 913; 359/359, 586, 589

[56] References Cited

U.S. PATENT DOCUMENTS

| | | | |
|---|---|---|---|
| 2,466,119 | 4/1949 | Moulton et al. ........................ | 88/1 |
| 3,712,711 | 1/1973 | Adadic ................................... | 428/336 |
| 3,934,961 | 1/1976 | Itoh et al. .............................. | 428/432 |
| 4,556,599 | 12/1985 | Sato et al. .............................. | 428/432 |
| 4,874,462 | 10/1989 | Makita et al. ......................... | 156/635 |
| 4,940,636 | 7/1990 | Brock et al. .......................... | 428/701 |
| 5,073,451 | 12/1991 | Iida et al. .............................. | 428/212 |
| 5,110,637 | 5/1992 | Ando et al. ........................... | 428/428 |
| 5,318,830 | 6/1994 | Takamatsu et al. ................... | 428/216 |

FOREIGN PATENT DOCUMENTS

| | | |
|---|---|---|
| 61-189501 | 8/1986 | Japan . |
| 64-43368 | 2/1989 | Japan . |
| 64-70701 | 3/1989 | Japan . |
| 3-17601 | 1/1991 | Japan . |
| 4-357135 | 12/1992 | Japan . |
| 4-357134 | 12/1992 | Japan . |
| 4-131530 | 12/1992 | Japan . |

*Primary Examiner*—Patrick J. Ryan
*Assistant Examiner*—William A. Krynski
*Attorney, Agent, or Firm*—Keck, Mahin & Cate

[57] ABSTRACT

The invention relates to a transparent coating on a transparent glass pane which may be a laminated glass pane such as an automobile windshield. The present invention provides a two-layer coating including a first layer which is a transparent oxide film in direct contact with the major surface of the glass substrate and a second layer which is a transparent oxide film. The first layer has a thickness of 70–230 nm and a refractive index of 1.80–2.10 and includes a major portion and a minor portion which is exposed and adapted to be used as a combiner of a head-up display system. The second layer is formed on the major portion of the first layer so as to expose the minor portion of the first layer. The second layer has a thickness of 110–130 nm and a refractive index of 1.40–1.50. An additional film is optionally formed on the minor portion of the first layer so as to fully or partly cover the minor portion. The additional layer is adapted to be used as a wavelength-selective combiner of the head-up display system. The two-layer coating except the minor portion is adapted to be used as a reflectance reducing coating. To reduce the reflectance of perpendicularly incident light the two-layer coating can be modified into a three-layer coating by interposing another oxide film.

15 Claims, 2 Drawing Sheets

GLASS PANE WITH REFLECTANCE REDUCING COATING AND COMBINER OF HEAD-UP DISPLAY SYSTEM

BACKGROUND OF THE INVENTION

The present invention relates to a transparent glass pane having a reflectance reducing coating and a combiner of a head-up display system. In particular, the glass pane is to be used as a vehicular window glass that is installed in an inclined position as in the case of a current automobile windshield, and the coating serves to reduce reflectance of visible light obliquely incident on the coated side of the glass pane.

There are various proposals of antireflection coatings for preventing or reducing the reflection of visible light from vehicular window glasses or windshields.

As a coating for the antireflection purpose, it is known to use a fluoride film and/or a laminate of a plurality of transparent oxide films which have different refractive indices. For example, JP 61-189501 A (1986) shows a three-layer coating made up of a first layer which is in contact with the glass surface and formed of $Al_2O_3$ or $CeF_3$ having a refractive index of 1.60–1.80, a second layer formed of a $ZrO_2/TiO_2$ mixture having a refractive index of 1.95–2.15 and a third layer which is formed of $MgF_2$ and has a refractive index of 1.30–1.45. JP 64-70701 A (1989) shows an antireflection three-layer coating which is electrically conductive and consists of a metal film coated on the glass surface as the first layer, a second layer which is a metal oxide film having a refractive index of 1.90–2.50 such as a $TiO_2$ film and a third layer which has a refractive index of 1.35–1.50 and is formed of either $SiO_2$ or $MgF_2$. As a modified way of using a fluoride, JP 3-17601 A (1991) proposes to form an antireflection coating by applying a solution of a metal oxide precursor such as a silicon alkoxide to a glass surface, heating the sol film on the glass surface to convert it into a gel film and further heating the gel film in a fluorine containing atmosphere to thereby form a metal oxide film containing fluoride of the metal.

However, for vehicular window glasses, fluoride containing coatings are generally insufficient in durability, and the use of fluorine or a fluoride often offers inconvenience to the industrial manufacturing operations.

JP 4-357134 A (1992) shows a two-layer coating made up of a first oxide film which is in contact with the glass surface and has a thickness of 70–90 nm and a refractive index of 1.8–1.9 and an outer second oxide film which has a thickness of 110–130 nm and a refractive index of 1.4–1.5. JP 4-357135 A (1992) shows a three-layer coating made up of a first oxide film which is in contact with the glass surface and a thickness of 70–100 nm and a refractive index of 1.8–1.9, a second oxide film which has a thickness of 130–160 nm and a refractive index of 2.05–2.3, and an outer third oxide film which has a thickness of 110–130 nm and a refractive index of 1.4–1.5. The reflectance of the glass pane coated with the coating of either JP 4-357134 A (1992) or JP 4-357135 A (1992) becomes lower than that of the glass pane without the coating by 4.5–6.5% with respect to visible light obliquely incident on the coated side of the glass pane at an angle of 50–70 degrees with the normal.

In contrast with the above-mentioned antireflection coatings, a combiner of a head-up display system, which is formed on a front windshield, has a relatively high reflectance. As is known, a head-up display system allows the driver of a car to view a vehicular information of an instrument panel, while looking out a front windshield of the car, by projecting an image of the instrument panel onto a combiner. JP 64-43368 A (1989) discloses a method of partially coating a solid substrate with a thin film useful as a combiner by changing the liquid level of coating liquid of an incomplete container which is in tight contact with the substrate. JP (Utility Model) 4-131530 A (1992) discloses a combiner including a first reflection layer which is directly attached to a windshield and has a relatively uniform reflectance throughout visible light spectrum and a second reflection layer which is directly formed on the first layer and has a selective reflection with respect to incident visible light.

If a high reflectance film as a combiner is formed on a portion of a surface of the above-mentioned reflectance reducing coating, for example, by the method of either JP 64-43368 A (1989) or JP (Utility Model) 4-131530 A (1992) to provide a windshield with an antireflection coating and a combiner, optical design tends to become complicated. Furthermore, in some cases, the combiner tends to have a dark color and a high excitation purity due to interference with the reflectance reducing coating. With this, the visible light transmittance may be lowered, and the combiner may not have desired characteristics. Still furthermore, if at least five-layer films are formed in total on a glass pane to form a combiner on a reflectance reducing coating, the external appearance of the glass pane tends to be deteriorated and the strength of the films tends to be lowered.

SUMMARY OF THE INVENTION

It is an object of the present invention to provide a transparent glass pane having a reflectance reducing coating and a combiner of a head-up display system, which is free of the above-mentioned drawbacks.

According to a first aspect of the present invention, there is provided a coated glass pane, comprising a transparent glass substrate and a coating formed on a major surface of the glass substrate, the coating comprising: a first layer which is a transparent oxide film in direct contact with the major surface of the glass substrate and has a thickness of 70–230 nm and a refractive index in the range from 1.80 to 2.10, said first layer having a major portion and a minor portion which is exposed and adapted to be used as a combiner of a head-up display system; and a second layer which is a transparent oxide film formed on the major portion of said first layer so as to expose the minor portion of said first layer, said first layer having a thickness of 110–130 nm and a refractive index in the range from 1.40 to 1.50, said second layer together with the major portion of said first layer being adapted to be used as a reflectance reducing coating.

The reflectance reducing coating is constructed such that, with respect to visible light incident on the coating from the coated side of the glass pane at an incidence angle in the range from 50 to 70 degrees, the reflectance of the coated glass pane is lower than the reflectance of the glass substrate without coating by 4.5 to 6.5%.

The above-mentioned two-layer coating according to the present invention is simple in construction and uses no fluoride. For visible light the transmittance of this coating can be made 70% or above. The coating itself is colorless or almost colorless. Therefore, when the coated glass pane is used as a vehicular windshield or window glass, the coating does not give an unpleasant or strange impression to persons on or outside the vehicle. The glass substrate may use a color glass sheet and may be a laminated glass pane.

In the present invention particular attention is paid to the incidence of visible light from the coated side of the glass pane at an angle of 50°–70° with a normal to the glass pane. This is in consideration of a fact that in many of the current automobiles the windshield makes an angle of about 40°–20° with a horizontal plane so that light emitted from the dashboard is liable to impinge on the inside of the windshield at an incidence angle of about 50°–70°. Since the coating according to the present invention reduces the reflectance of the windshield for such obliquely incident visible light by 4.5–6.5%, the reflection of the dashboard in the windshield becomes almost inappreciable to the driver or the occupant of the next seat. This is very favorable for the safety of driving and also for the comfort of the passengers. In the current automobiles, the dashboard usually has a blackish or very dark color sometimes with embossing finish. When the present invention is used in an automobile windshield, it will be free to give a light color to the dashboard, and a widened selection of the dashboard finishing material will be possible.

In the present invention, the second layer is removed in only certain areas so as to expose the above-mentioned minor portion of the first layer. The exposed minor portion of the first layer having a suitably higher refractive index than that of the second layer is suitable to be used as a combiner of a head-up display system. With the combiner, driving information is markedly recognized by a driver while the driver looks out a front windshield of a car.

Furthermore, according to the present invention, it is optional that the minor portion of the first layer is fully or partly covered by an additional film having a thickness of 50–200 nm and a refractive index in the range from 2.00 to 2.50. The additional film is suitable to be used as a wavelength-selective combiner of a head-up display system. When the minor portion of the first layer is partly covered by the additional film, a part of the minor portion, which is not covered by the additional film, will serve as a wavelength-nonselective combiner. On the other hand, the additional film will serve as a wavelength-selective combiner. Thus, in this case, the head-up display system has both of a wavelength-nonselective combiner and a wavelength-selective combiner. This leads to diversification of display manner of the head-up display system.

The combiner according to the present invention does not have a dark color nor a high excitation purity by suppressing interference with the reflectance reducing coating. With this, the entire surface of the coated glass pane will be desirably high in visible light transmittance. Thus, the combiner will have desired characteristics, and the coating will be superior in film strength.

According to a second aspect of the present invention, there is provided a coated glass pane, comprising a transparent glass substrate and a coating formed on a major surface of the glass substrate, the coating comprising: a first layer which is a transparent oxide film in direct contact with the major surface of the glass substrate and has a thickness of 70–100 nm and a refractive index in the range from 1.80 to 1.95, said first layer having a major portion and a minor portion which is exposed and adapted to be used as a combiner of a head-up display system; a second layer which is a transparent oxide film formed on the major portion of said first layer so as to expose the minor portion of said first layer, said second layer having a thickness of 130–165 nm and a refractive index in the range from 2.10 to 2.30; and a third layer which is a transparent oxide film formed on said second layer so as to expose the minor portion of said first layer, said third layer having a thickness of 110–130 nm and a refractive index in the range from 1.40 to 1.50; said third layer together with said second layer and the major portion of said first layer being adapted to be used as a reflectance reducing coating.

The three-layer coating according to the present invention is nearly equivalent to the two-layer coating in both the transmittance for visible light and the ability to reduce the reflection of obliquely incident visible light, and the three-layer coating is superior to the two-layer coating in the ability to reduce the reflection of perpendicularly or nearly perpendicularly incident light.

Similar to the two-layer coating, the second and third layers of the three-layer coating are removed in only certain areas so as to expose the above-mentioned minor portion of the first layer. The exposed minor portion of the first layer of the three-layer coating, which has a suitably higher refractive index than that of the third layer, is suitable to be used as a combiner of a head-up display system.

Furthermore, similar to the two-layer coating, it is optional that the minor portion of the first layer of the three-layer coating is fully or partly covered by the above-mentioned additional film having a thickness of 50–200 nm and a refractive index in the range from 2.00 to 2.50. The additional film is suitable to be used as a wavelength-selective combiner of a head-up display system.

DESCRIPTION OF THE PREFERRED EMBODIMENTS

With reference to FIGS. 1–4, a transparent glass pane having a reflectance reducing coating and a combiner of a head-up display system will be described in accordance with the present invention in the following.

Figure 1:
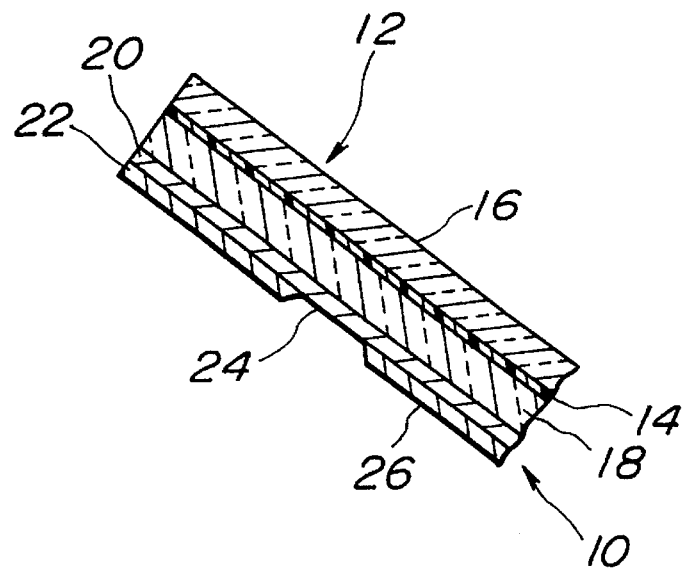
FIG. 1 is a fragmentary enlarged sectional view of a laminated glass pane having a first oxide layer which is directly formed on an inboard surface of the glass pane and has an exposed minor portion as a combiner and a major portion on which a second oxide layer is formed.

FIG. 1 shows a two-layer coating 10 according to the present invention on a laminated glass pane 12 which is made by sandwiching a transparent plastic interlayer 14 between two transparent glass sheets 16, 18. The coating 10 is also transparent. Assuming that the laminated glass; pane 12 is an automobile windshield, the coating 10 is formed on the inboard side of the windshield.

The laminated glass pane 12 in FIG. 1 is a merely by way of example. Alternatively a pane of a glass sheet can be employed, and it is also optional to apply the present invention to an insulated glass panel. The present invention is always applied to a transparent glass pane, but the glass pane is not necessarily colorless. The glass pane may use a color glass such as bluish, greenish, grayish, bronzy or golden glass, and the color glass may be an ultraviolet and/or infrared absorbing glass. It is optional to use a tempered or partly tempered glass sheet. It is also possible to use an organic glass. Irrespective of the type of the glass, either of a flat glass pane or a curved glass pane can be used.

The two-layer coating 10 is made up of a first oxide layer 20 formed directly on the surface of the glass sheet 18 and a second oxide layer 22 laid on the first layer 20. A minor portion 24 of the first oxide layer 20 is exposed by removing a minor portion of the second oxide layer 22. The first oxide layer 20 is 70 to 230 nm in thickness and has a refractive index in the range from 1.80 to 2.10. The second oxide layer 22 is 110 to 130 nm in thickness and has a refractive index in the range from 1.40 to 1.50. With such specific and strict limitations on the thicknesses and refractivities of the respective layers 20, 22, a major portion 26 which is greater in area than the minor portion 24, as clearly depicted in the FIGS., of the two-layer coating 10 except the minor portion 24 can adequately reduce reflectance of visible light rays that are obliquely incident on the coated side of the glass pane 12. With this coating 10 the glass pane 12 is sufficiently high, i.e. at least 70%, in transmittance for visible light. In the following description the term "light" refers to visible light unless noted otherwise.

When the angle of incidence is in the range from 50 to 70 degrees with a normal to the glass pane 12, the major portion 26 of the coating 10 serves the purpose of reducing reflectance to such an extent that the reflectance of the coated glass pane is lower than that of the glass pane 12 itself (without coating) by 4.5–6.5%. By such a reduction in the reflectance, the reflectance of the dashboard in the windshield becomes almost inappreciable to the driver and the occupant of the next seat. With this coating 10, the amount of reduction in the reflectance depends on the angle of incidence and gradually increases as the angle of incidence becomes greater.

In contrast with the above-mentioned major portion 26 for the reflectance reduction, it should be noted that the above-mentioned minor portion 24 of the first oxide layer 20 has a suitably higher refractive index than that of the second oxide layer. Therefore, the minor portion 24 is suitable as a combiner of a head-up display system.

As to the material of the first layer 20 of the coating 10, it is suitable to use a mixed oxide which is a combination of at least one of $TiO_2$ and $ZrO_2$, which are relatively high in refractivity, and at least one of $SiO_2$, $Al_2O_3$ and $B_2O_3$ which are relatively low in refractivity. $TiO_2$ has a refractive index of about 2.25, and $ZrO_2$ about 1.95. $SiO_2$ has a refractive index of about 1.45, $Al_2O_3$ about 1.65 and $B_2O_3$ about 1.60. Therefore, it is easy to choose a combination suitable for forming a mixed oxide film having a refractive index in the range from 1.80 to 2.10, and in almost every case the mixed oxide film is very good in durability.

As to the second layer 22 of the coating 10, it is preferred to employ $SiO_2$ as the sole material of this layer in view of the value of refractive index and the ease of forming into a uniform and durable film.

Figure 2:
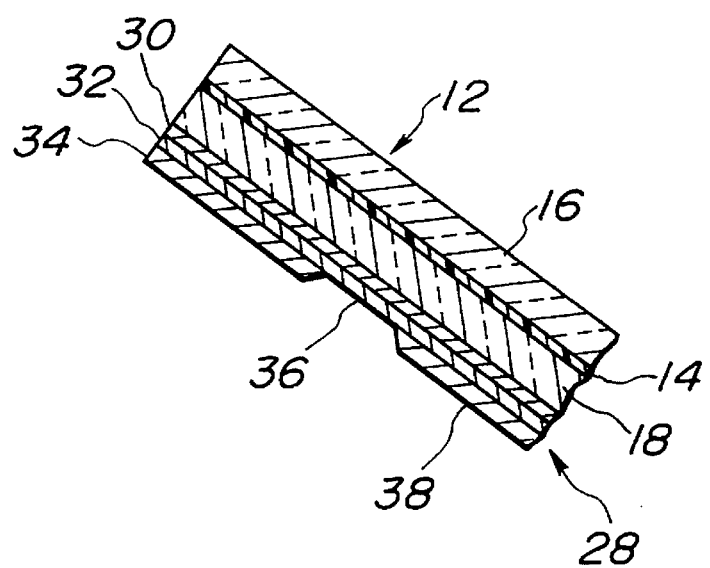
FIG. 2 is a view similar to FIG. 1, but showing a laminated glass pane having a first oxide layer which has; an exposed minor portion as a combiner and a major portion on which second and third oxide layers are formed.

FIG. 2 shows a three-layer coating 28 according to the present invention on a laminated glass pane 12. This coating 28 is made up of three oxide layers 30, 32, 34. The first oxide layer 30, which is formed directly on the glass sheet 18 of the glass pane 12, is 70–100 nm in thickness and has a refractive index in a range from 1.80 to 1.95. The second oxide layer 32, which is the middle layer, is 130–165 nm in thickness and has a refractive index in a range from 2.10 to 2.30. The third oxide layer 34, which is the outermost layer, is 110–130 nm in thickness and has a refractive index in a range from 1.40 to 1.50.

A minor portion 36 of the first oxide layer 30 is exposed by removing minor portions of the second and third oxide layers 32, 34. It should be noted that the minor portion 36 has a suitably higher refractive index than that of the third oxide layer 34. Therefore, the minor portion 36 is suitable as a combiner of a head-up display system.

In the three-layer coating 28 in FIG. 2, the first layer 30 is identical with the first layer 20 of the two-layer coating 10 in Fig. 1 with respect to only the composition. The third layer 34 of the three-layer coating 28 is identical-with the second layer 22 of the two-layer coating 10 with respect to the thickness, the refractive index and the composition. With respect to obliquely incident light at an angle ranging from 50 to 70 degrees with the normal, the reflectance reducing performance of a major portion 38 of the three-layer coating 28 is nearly equivalent to that of the major portion 26 of the two-layer coating 10. However, as compared with the two-layer coating 10, the three-layer coating 28 has the effect of reducing the reflectance of light incident normal or nearly normal to the coating 28 and, besides, reducing the reflectance of light reflected at an angle smaller than the angle of incidence. With the three-layer coating 28, the visible light transmittance of the glass pane is still 70% or above.

As the material of the second or middle layer 32, it is suitable to use $Ta_2O_5$ (refractive index: about 2.05) or $TiO_2$, or a combination of $Ta_2O_5$ and $TiO_2$, or a combination of at least one of $Ta_2O_5$ and $TiO_2$ and at least one of $SiO_2$, $ZrO_2$, $Al_2O_3$ and $B_2O_3$. By any of these options the second layer 32 becomes good in adhesion to the first and third layers 30, 34, and the three-layer coating 28 becomes very good in durability. By using a combination of at least two kinds of metal oxides different in refractivity, it is easy to desirably adjust the refractive index of the second layer 32.

Usually it is favorable to form each layer of a two- or three-layer coating according to the present invention by the sol-gel process using an alkoxide solution. It is usual to form the coating on the glass sheet by dip coating, spin coating, roller coating, curtain flow coating, nozzle flow coating or the like. It is needless to say that viscosity and the like are adjusted depending on the method of forming the coating or the condition for forming the coating.

Figure 3:
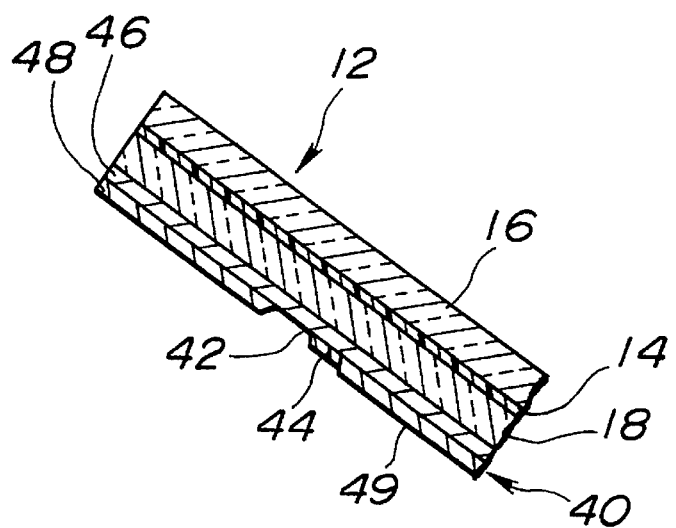
FIG. 3 is a view similar to FIG. 1, but showing a laminated glass pane having a first oxide layer having a minor portion which is partly covered by an additional film and a major portion on which a second oxide layer is formed.

FIG. 3 shows another two-layer coating 40 according to the present invention on a laminated glass pane 12. This coating 40 is identical with the two-layer coating 10 in FIG. 1 except that a minor portion 42 is partly covered with an additional oxide film 44. The coating 40 is made up of first and second oxide layers 46, 48 which are identical with the first and second oxide layers 20, 22 in FIG. 1 with respect to the thickness, the refractive index and the composition. It is optional that the minor portion 42 which is not covered with the second layer 48 is fully covered with the additional oxide film 44. The additional oxide film 44 is 50–200 nm in thickness and has a refractive index in the range from 2.00 to 2.50. As to the material of the additional oxide film 44, it is suitable to use $TiO_2$ or a combination of $TiO_2$ and at least one member selected from the group consisting of $SiO_2$ and $ZrO_2$. An exposed part of the minor portion 42 is suitable as a wavelength-nonselective combiner. On the other hand, the additional oxide film 44 is suitable as a wavelength-selective combiner. The reflectance reducing performance of a major portion 49 of the two-layer coating 49 is equivalent to that of the major portion 26 of the two-layer coating 10 in FIG. 1.

Figure 4:
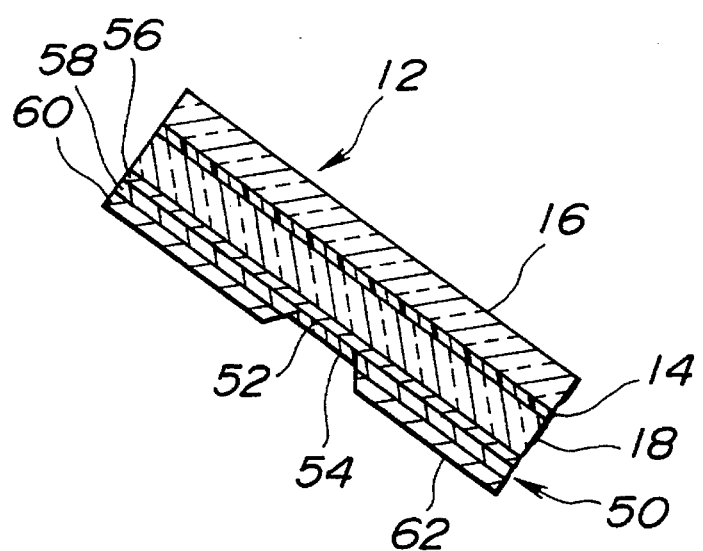
FIG. 4 is a view similar to FIG. 1, but showing a laminated glass pane having a first oxide layer having a minor portion which is fully covered by the additional film and a major portion on which second and third layers are formed.

FIG. 4 shows another three-layer coating 50 according to the present invention on a laminated glass pane 12. This coating 50 is identical with the three-layer coating 28 in FIG. 2 except that a minor portion 52 is fully covered with an additional oxide film 54. The coating 50 is made up of first, second and third oxide layers 56, 58, 60 which are identical with the first, second and third oxide layers 30, 32, 34 in FIG. 2 with respect to the thickness, the refractive index and the composition. It is optional that the minor portion 52 which is not covered with the second layer 58 is partly covered with the additional oxide film 54. The additional oxide film 54 is identical with the additional oxide film 44 in FIG. 3 with respect to the thickness, the refractive index and the composition. The additional oxide film 54 is suitable as a wavelength-selective combiner. The reflectance reducing performance of a major portion 62 of the three-layer coating 50 is equivalent to that of the major portion 38 of the three-layer coating 28 in FIG. 2.

The following nonlimitative examples are illustrative of the present invention.

EXAMPLE 1

This example relates to a two-layer coating according to the present invention on a laminated glass pane to be used as an automobile windshield. In advance of producing the laminated glass pane 12 shown in FIG. 1, the coating 10 was formed on the transparent bronze-colored glass sheet 18 which becomes the inside of the windshield.

A mixed alkoxide solution was prepared by mixing titanium methoxide and silicon methoxide in a proportion of 60 to 40 by mol and dissolving the mixture in isopropyl alcohol. In the solution, the solid concentration was adjusted to about 3.0 wt %, and the viscosity of the solution was adjusted to about 2 cP ( for example, a range from 1 to 3 cP is preferable).

The glass sheet 18 having a length of about 1.5 m, a width of about 1.0 m and a thickness of about 2 mm was washed with filtered water and dried with dry air. The outside surface of the glass sheet 18 was covered with masking tape, and the glass sheet 18 was immersed in the mixed alkoxide solution and drawn up from the solution at a rate of about 4.0 mm/sec. Then, the glass sheet 18 was allowed to stand for about 1 min so as to dry the coated sol film (the first layer 20). Then, the masking tape was removed, and the glass sheet 18 was heated at a temperature of about 270° C. for about 7 min to thereby convert the mixed alkoxide sol film on the inside surface into a hard gel film (the first layer 20). After that the glass sheet 18 was again washed and dried in the same manner as the above, and then the uncoated outside surface of the glass sheet 18 was again covered with masking tape. Then, the glass sheet 18 was immersed in an alcohol solution of silicon methoxide. The solid concentration of this solution was about 6.0 wt %, and the viscosity was about 2 cP (for example, a range from about 1 to about 3 cP is preferable). The glass sheet was drawn up from the solution at a rate of about 3.2 mm/sec. Then, the glass sheet was allowed to stand for about 1 min so as to dry the coated sol film (the second layer 22). Then, the masking tape was removed.

Then, the second layer was removed in only certain areas by the following method which is substantially similar to that disclosed by U.S. Pat. No. 4,874,462.

The glass sheet 18 was put on a table for screen printing in a manner to expose the coated side of the glass sheet 18. By screen printing, a paste prepared by mixing water, polyethylene glycol, citric acid and a filler was applied to certain areas of the second layer using a180 mesh nylon screen. Then, the glass sheet 18 was heated at a temperature of about 270° C. for about 15 min to thereby convert the mixed alkoxide sol film into a hard gel film (the second layer 22). After cooling, the glass sheet 18 was washed with an aqueous solution of sodium hydroxide (about 0.5N) to partially dissolve and peel the gel film (the second layer 22) only in the areas covered with the paste. Then, the glass sheet 18 was washed with an aqueous solution of sulfuric acid (1N) to completely dissolve and remove the residues of the gel film (the second layer 22). As a consequence, the first layer 20 was partially exposed. This exposed minor portion 24 of the first layer 20 having the after-mentioned refractive index proved to be useful as a combiner of a head-up display system. In the areas 26 not precedently covered with the paste, the hard gel film (the second layer 22) was fully resistant to the washing liquids. The coated glass sheet 18 was laminated with another transparent glass sheet 16. This laminated glass pane 12 was placed in a furnace and bent into a predetermined curved shape. Then, a polyvinyl butyral film 14 was sandwiched between the glass sheets 16, 18 to obtain the laminated glass pane 12 having the two-layer coating 10.

In this example, the first layer 20 of the two-layer coating 10 was a $TiO_2$—$SiO_2$ mixed oxide film which was about 80 nm in thickness and had a refractive index of 1.90. The second layer 22 was a $SiO_2$ film which was about 120 nm and had a refractive index of 1.45. With respect to the reflection of visible light incident on the coated side of the coated glass pane 12 at an angle of about 61° with the normal, the coating 10 (more exactly speaking the two-layered major portion 26) proved to be capable of reducing the reflectance by about 6%. That: is, without the coating 10 the reflectance of the glass pane 12 was about 16%, and with the coating 10 the reflectance became about 10%. The glass pane 12 having the two-layer coating 10 was about 83% in visible light transmittance.

The above-mentioned exposed minor portion 24 of the first layer 20 was about 19% in visible light reflectance and from about 72% to about 73% in visible light transmittance. Thus, the exposed portion 24 exhibited optical characteristics suitable for a wavelength-nonselective combiner (neutral combiner) having a substantially uniform reflectance throughout visible light wavelength spectrum.

EXAMPLE 2

The process of Example 1 was modified in respect of the mixed oxide composition of the first layer 20 of the coating 10 shown in FIG. 1.

In this example, a mixed alkoxide solution was prepared by mixing zirconium methoxide and silicon methoxide in a proportion of 90 to 10 by mol and dissolving the mixture in isopropyl alcohol. In the solution, the solid concentration was adjusted to about 2.8 wt %, and the viscosity of the solution was adjusted to about 3 cP. Using this solution at the first stage, the s coating and heating process of Example 1 was repeated so as to form a first layer 20. Then, using the same alcohol solution of silicon methoxide as that of Example 1, the coating process of Example 1 was repeated, except that the glass sheet 18 was drawn up from the solution at a rate of about 3.5 mm/sec, so as to form a second layer 22. Then, the second layer 22 was removed in only certain areas by the same method as in Example 1. After that, the lamination of the glass sheets 16, 18 and the heat bending of the glass sheets 16, 18 were carried out in the same manner as in Example 1.

In the two-layer coating 10 of this example, the first layer 20 was a $ZrO_2$—$SiO_2$ mixed oxide film which was about 75 nm and had a refractive index of 1.85. The second layer 22 was a $SiO_2$ film which was about 125 nm in thickness and had a refractive index of 1.45. With respect to the reflection of visible light incident on the inside of the laminated glass pane 12 at an angle of about 60° with the normal, the coating 10 (more exactly speaking the two-layered major portion 26) proved to be capable of reducing the reflectance by about 6%. That is, without the coating 10 the reflectance of the glass pane 12 was about 16%, and with the coating 10 the reflectance became about 10%. The exposed minor portion 24 of the first layer 20 was about 18% in visible light reflectance and from about 73% to about 74% in visible light transmittance. Thus, the exposed minor portion 24 exhibited optical characteristics suitable for a neutral combiner. The coating 10 was excellent in abrasion resistance and chemical resistance.

EXAMPLE 3

The process of Example 1 was modified in respect of the mixed oxide composition of the first layer 20 of the coating 10 shown in FIG. 1.

In this example, a mixed alkoxide solution was prepared by mixing titanium methoxide and aluminum methoxide in a proportion of 58 to 42 by mol and dissolving the mixture in a mixed solvent of isopropyl alcohol and n-butanol. In the solution, the solid concentration was adjusted to about 2.5 wt %. Using this solution at the first stage, the coating and heating process of Example 1 was repeated, except that the glass sheet 18 was drawn up from the solution at a rate of about 4.2 mm/sec, so as to form a first layer 20. Then, using the same alcohol solution of silicon methoxide as that of Example 1, the coating process of Example 1 was repeated so as to form a second layer 22. Then, the second layer 22 was removed in only certain areas by the same method as in Example 1. After that, the lamination of the glass sheets 16, 18 and the heat bending of the glass sheets 16, 18 were carried out in the same manner as in Example 1.

In the two-layer coating 10 of this example, the first layer 20 was a $TiO_2$—$Al_2O_3$ mixed oxide film which was about 80 nm and had a refractive index of 1.95. The second layer 22 was a $SiO_2$ film which was about 120 nm in thickness and had a refractive index of 1.45. With respect to the reflection of visible light incident on the inside of the laminated glass pane 12 at an angle of about 58° with the normal, the coating 10 (more exactly speaking the two-layered major portion 26) proved to be capable of reducing the reflectance by about 5%. That is, without the coating 10 the reflectance of the glass pane 12 was about 16%, and with the coating 10 the reflectance became about 11%. The exposed portion 24 of the first layer 20 was about 20% in visible light reflectance and from about 71% to about 72% in visible light transmittance. Thus, the exposed portion 24 exhibited optical characteristics suitable for a neutral combiner. The coating 10 was excellent in abrasion resistance and chemical resistance.

EXAMPLE 4

This example is substantially similar to Example 1. In this example, a mixed alkoxide solution was prepared by mixing titanium methoxide and silicon methoxide in a proportion of 80 to 20 by mol and dissolving the mixture in isopropyl alcohol. In the solution, the solid concentration was adjusted to about 5.0 wt %. Using this solution at the first stage, the coating and heating process of Example 1 was repeated, except that the glass sheet 18 shown in FIG. 1 was drawn up from the solution at a rate of about 5.0 mm/sec, so as to form a first layer 20. Then, using the same alcohol solution of silicon methoxide as that of Example 1, the coating process of Example 1 was repeated so as to form a second layer 22. Then, the second layer 22 was removed in only certain areas by the same method as in Example 1. After that, the lamination of the glass sheets 16, 18 and the heat bending of the glass sheets 16, 18 were carried out in the same manner as in Example 1.

In the two-layer coating 10 of this example, the first layer 20 was a $TiO_2$—$SiO_2$ mixed oxide film which was about 225 nm and had a refractive index of 2.05. The second layer 22 was a $SiO_2$ film which was about 120 nm in thickness and had a refractive index of 1.45. With respect to the reflection of visible light incident on the inside of the laminated glass pane 12 at an angle of about 63° with the normal, the coating 10 (more exactly speaking the two-layered major portion 26) proved to be capable of reducing the reflectance by about 6%. That is, without the coating 10 the reflectance of the glass pane 12 was about 1.6%, and with the coating 10 the reflectance became about 10%. With respect to the reflection of visible light incident on the inside of the laminated glass pane 12 at an angle of about 63°, the exposed minor portion 24 of the first layer 20 was about 530 nm in reflection dominant wavelength. The exposed portion 24 was about 29 to about 31% in visible light reflectance at the dominant wavelength and from about 71% to about 72% in visible light transmittance. Thus, the exposed portion 24 exhibited optical characteristics suitable for a wavelength-selective combiner which selectively reflects a green color with respect to visible light incident on the laminated glass pane 12 at an angle of about 63°. The two-layered major portion 26 and the exposed portion 24 of the first layer 20 were excellent in abrasion resistance and chemical resistance.

EXAMPLE 5

This example relates to a three-layer coating 28 shown in FIG. 52 according to the present invention on a laminated glass pane 12 to be used as an automobile windshield. In advance of producing the laminated glass pane 12, the three-layer coating 28 was formed on the glass sheet 18 which becomes the inside of the windshield.

Using the same solution as that in Example 1, the coating and heating process of Example 1 was repeated, except that the glass sheet 18 was drawn up from the solution at a rate of about 4.2 mm/sec, so as to form a first layer 30. After that the uncoated outside of the glass sheet 18 was again covered with masking tape, and the glass sheet 18 was immersed in an isopropyl alcohol solution of titanium methoxide. The solid concentration of this solution was about 5.0 wt %. The glass sheet 18 was drawn up from the titanium methoxide solution at a rate of about 4.8 mm/sec so as to form a second layer 32. Then, the second layer 32 was removed in only certain areas by the same method as in Example 1. Then, using the same silicon methoxide solution as that of Example 1, the coating process of the second layer 22 of Example 1 was repeated, except that the glass sheet 18 was drawn up from the solution at a rate of about 3.1 mm/sec, so as to form a third layer 34. Then, the third layer 34 was removed in only the same certain areas by the same method as in Example 1. Thus, the first layer 30 was exposed in only the certain areas. After that, the lamination of the glass sheets 16, 18 and the heat bending of the glass sheets 16, 18 were carried out in the same manner as in Example 1.

In the three-layer coating 28 of this example, the first layer 30 was a TiO$_2$—SiO2 mixed oxide film which was about 85 nm and had a refractive index of 1.90. The second layer 32 was a TiO$_2$ film which was about 160 nm in thickness and had a refractive index of 2.20. The third layer 34 was a SiO$_2$ film which was about 115 nm and a refractive index of 1.45. With respect to the reflection of visible light incident on the inside of the laminated glass pane 12 at an angle of about 61° with the normal, the coating 28 (more exactly speaking the two-layered major portion 38) proved to be capable of reducing the reflectance by about 5%. That is, without the coating 28 the reflectance of the glass pane 12 was about 16%, and with the coating 28 the reflectance became about 11%. The exposed portion 36 of the first layer 30 was about 18% in visible light reflectance and from about 72% to about 73% in visible light transmittance. Thus, the exposed portion 36 exhibited optical characteristics suitable for a neutral combiner. The coating 28 was excellent in abrasion resistance and chemical resistance.

EXAMPLE 6

An additional film 44 shown in FIG. 3 which is suitable as a wavelength-selective combiner was added to a glass pane 12 having a two-layer coating 40 which is substantially similar to that of Example 1.

Using the same mixed solution of titanium methoxide and silicon methoxide as that of Example 1, the coating and heating process of Example 1 was repeated, except that the glass sheet 18 was drawn up from the solution at a rate of about 3.8 mm/sec, so as to form a first layer 46. Then, using the same silicon methoxide solution as that of Example 1, the coating process of Example 1 was repeated so as to form a second layer 48. Then, the second layer 48 was removed in only certain areas by the same method as in Example 1. With this, the first layer 46 was exposed in only the certain areas. Then, a titanium methoxide solution in which the solid concentration had been adjusted to about 4.5 wt % was applied to a part of the exposed portion 42 of the first layer 46 by a screen printing method using a180 mesh nylon screen so as to form the additional film 44 on the exposed portion 42 of the first layer 46. Then, the glass sheet 18 was heated at a temperature of about 270° C. for about 15 min to thereby convert the alkoxide sol film into a hard gel film. After that, the lamination of the glass sheets 16, 18 and the heat bending of the glass sheets 16, 18 were carried out in the same manner as in Example 1.

In this example, the first layer 46 was a TiO$_2$—SiO$_2$ mixed oxide film which was about 75 nm and had a refractive index of 1.90. The second layer 48 was a SiO$_2$ film which was about 120 nm in thickness and had a refractive index of 1.45. With respect to the reflection of visible light incident on the inside of the laminated glass pane 12 at an angle of about 61° with the normal, the coating 40 (more exactly speaking the two-layered major portion 49) proved to be capable of reducing the reflectance by about 6%. That is, without the coating 40 the reflectance of the glass pane 12 was about 16%, and with the coating 40 the reflectance became about 10%. The major portion 49 was from about 83 to about 84% in visible light transmittance. The exposed minor portion 42 of the first layer 46 was about 19% in visible light reflectance and from about 72% to about 73% in visible light transmittance. Thus, the exposed minor portion 42 exhibited optical characteristics suitable for a neutral combiner. The additional film 44 was about 24% in visible light reflectance with respect to visible light incident on the laminated glass pane 12 at an angle of about 61°. The additional film 44 had a reflection peak at about 530 nm and selectively reflects a green color with respect to visible light incident on the laminated glass pane 12 at an angle of about 61°. Thus, the additional film 44 exhibited optical characteristics which are suitable for a wavelength-selective combiner. The coating 40 was excellent in abrasion resistance and chemical resistance.

EXAMPLE 7

An additional film 54 shown in FIG. 4 as a wavelength-selective combiner was formed on the entire surface of an exposed minor portion 52 of a first layer 56 of a three-layer coating 50 which is substantially similar to that of Example 5.

Using the same mixed solution of titanium methoxide and silicon methoxide as that of Example 1, the coating and heating process of Example 6 was repeated so as to form the first layer 56. Then, using the same titanium methoxide solution as that of Example 5, the coating process of Example 5 was repeated, except that the glass sheet 18 was drawn up from the solution at a rate of about 3.6 mm/sec, so as to form a second layer 58. Then, the second layer 58 was removed in only certain areas by the same method as in Example 1. With this, the first layer 56 was exposed in only the certain areas. Then, using the same silicon methoxide solution as that of Example 1, the coating process of Example 1 was repeated, except that the glass sheet was drawn up from the solution at a rate of about 3.3 mm/sec, so as to form a third layer 60. Then, the third layer 60 was removed in only the same certain areas as the removed portion of the second layer 58 by the same method as in Example 1. With this, the first layer 56 was exposed in only the certain areas 52. Then, the same titanium methoxide solution as that of Example 6 was applied to the entire surface of the exposed portion 52 of the first layer 56 by the same method as that of Example 6 so as to form the additional film 54 on the first layer 56. After that, the lamination of the glass sheets 16, 18 and the heat bending of the glass sheets 16, 18 were carried out in the same manner as in Example 1.

In this example, the first layer 56 was a TiO$_2$–SiO$_2$ mixed oxide film which was about 75 nm and had a refractive index of 1.90. The second layer 58 was a TiO$_2$ film which was about 120 nm in thickness and had a refractive index of 2.20. The third layer 60 was a Si0$_2$ film which was about 125 nm in thickness and had a refractive index of 1.45. With respect to the reflection of visible light incident on the inside of the laminated glass pane 12 at an angle of about 61° with the normal, the coating 50 (more exactly speaking the two-layered major portion 62) proved to be capable of reducing the reflectance by about 5%. That is, without the coating 50 the reflectance of the glass pane 12 was about 16%, and with the coating 50 the reflectance became about 11%. The additional film 54 on the first layer 56 exhibited optical characteristics which are similar to those of the additional film 44 of Example 6. That is, the additional film 54 of Example 7 also exhibited optical characteristics which are suitable for a wavelength-selective combiner. The coating 50 was excellent in abrasion resistance and chemical resistance.

What is claimed is:

1. A coated glass pane, comprising a transparent glass substrate and a fluoride-free coating formed on a major surface of the glass substrate, the fluoride-free coating comprising:

a first layer which is a transparent oxide film in direct contact with the major surface of the glass substrate and has a thickness of 70–230 nm and a refractive index in the range from 1.80 to 2.10, said first layer having a major portion and a minor portion which is exposed and adapted to be used as a combiner of a head-up display system; and a second layer which is a transparent oxide film formed on the major portion of said first layer so as to expose the minor portion of said first layer, said second layer having a thickness of 110–130 nm and a refractive index in the range from 1.40 to 1.50, said second layer together with the major portion of said first layer being adapted to be used as a reflectance reducing coating.

2. A coated glass pane according to claim 1, wherein said first and second layers are constructed such that, with respect to visible light incident on said second layer from the coated side of the coated glass pane at an incidence angle in the range from 50 to 70 degrees, the reflectance of the coated glass pane is lower than the reflectance of the glass substrate without coating by 4.5 to 6.5%.

3. A coated glass pane according to claim 1, wherein said first layer is a mixed oxide film comprising at least one relatively high refractivity oxide selected from the group consisting of $TiO_2$ and $ZrO_2$ and at least one relatively low refractivity oxide selected from the group consisting of $SiO_2$, $Al_2O_3$ and $B_2O_3$.

4. A coated glass pane according to claim 3, wherein said first layer is a binary oxide film formed of $TiO_2$ and $SiO_2$.

5. A coated glass pane according to claim 3, wherein said first layer is a binary oxide film formed of $ZrO_2$ and $SiO_2$.

6. A coated glass pane according to claim 3, wherein said first layer is a binary oxide film formed of $TiO_2$ and $Al_2O_3$.

7. A coated glass pane according to claim 1, wherein said second layer is a $SiO_2$ film.

8. A coated glass pane, comprising a transparent glass substrate and a fluoride-free coating formed on a major surface of the glass substrate, the fluoride-free coating comprising:

a first layer which is a transparent oxide film in direct contact with the major surface of the glass substrate and has a thickness of 70–100 nm and a refractive index in the range from 1.80 to 1.95, said first layer having a major portion and a minor portion which is exposed and adapted to be used as a combiner of a head-up display system;

a second layer which is a transparent oxide film formed on the major portion of said first layer so as to expose the minor portion of said first layer, said second layer having a thickness of 130–165 nm and a refractive index in the range from 2.10 to 2.30; and a third layer which is a transparent oxide film formed on said second layer so as to expose the minor portion of said first layer, said third layer having a thickness of 110–130 nm and a refractive index in the range from 1.40 to 1.50, said third layer together with said second layer and the major portion of said first layer being adapted to be used as a reflectance reducing coating.

9. A coated glass pane according to claim 8, wherein said first layer is a mixed oxide film comprising at least one relatively high refractivity oxide selected from the group consisting of $TiO_2$ and $ZrO_2$ and at least one relatively low refractivity oxide selected from the group consisting of $SiO_2$, $Al_2O_3$ and $B_2O_3$.

10. A coated glass pane according to claim 9, wherein said first layer is a binary oxide film formed of $TiO_2$ and $SiO_2$.

11. A coated glass pane according to claim 8, wherein said third layer is a $SiO_2$ film.

12. A coated glass pane according to claim 8, wherein said second layer is a film comprising at least one member selected from the group consisting of $TiO_2$, $Ta_2O_5$, and a combination of at least one member selected from the group consisting of $TiO_2$ and $Ta_2O_5$ and at least one member selected from the group consisting of $SiO_2$, $ZrO_2$, $Al_2O_3$ and $B_2O_3$.

13. A coated glass pane, comprising a transparent glass substrate and a fluoride-free coating formed on a major surface of the glass substrate, the fluoride-free coating comprising:

a first layer which is a transparent oxide film in direct contact with the major surface of the glass substrate and has a thickness of 70–230 nm and a refractive index in the range from 1.80 to 2.10, said first layer having minor and major portions;

a second layer which is a transparent oxide film formed on the major portion of said first layer and has a thickness of 110–130 nm and a refractive index in the range from 1.40 to 1.50, said second layer together with the major portion of said first layer being adapted to be used as a reflectance reducing coating; and an additional film which is a transparent oxide film formed on the minor portion of said first layer so as to fully or partly cover the minor portion of said first layer, said additional film having a thickness of 50–200 nm and a refractive index in the range from 2.50 to 2.50 and being adapted to be used as a wavelength-selective combiner of a head-up display system.

14. A coated glass pane according to claim 13, wherein said additional film is a film comprising at least one member selected from the group consisting of $TiO_2$ and a combination of $TiO_2$ and at least one member selected from the group consisting of $SiO_2$ and $ZrO_2$.

15. A coated glass pane, comprising a transparent glass substrate and a fluoride-free coating formed on a major surface of the glass substrate, the fluoride-free coating comprising:

a first layer which is a transparent oxide film in direct contact with the major surface of the glass substrate and has a thickness of 70–100 nm and a refractive index in the range from 1.80 to 1.95, said first layer having minor and major portions;

a second layer which is a transparent oxide film formed on the major portion of said first layer and has a thickness of 130–165 nm and a refractive index in the range from 2.10 to 2.30;

a third layer which is a transparent oxide film formed on s said second layer and has a thickness of 110–130 nm and a refractive index in the range from 1.40 to 1.50; and an additional film which is a transparent oxide film formed on the minor portion of said first layer so as to fully or partly cover the minor portion of said first layer, said additional film having a thickness of 50–200 nm and a refractive index in the range from 2.00 to 2.50 and being adapted to be used as a wavelength-selective combiner of a head-up display system.

* * * * *